United States Patent
Chuang

(10) Patent No.: US 7,821,651 B2
(45) Date of Patent: Oct. 26, 2010

(54) APPARATUS AND METHOD FOR MEASURING DISTANCES

(75) Inventor: Ping-Yang Chuang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 237 days.

(21) Appl. No.: 12/184,207

(22) Filed: Jul. 31, 2008

(65) Prior Publication Data

US 2009/0262369 A1    Oct. 22, 2009

(30) Foreign Application Priority Data

Apr. 16, 2008   (CN) .................. 2008 1 0301162

(51) Int. Cl.
*G01B 11/14*    (2006.01)
(52) U.S. Cl. ...................... 356/614; 356/622
(58) Field of Classification Search ........ 356/614–623; 250/559.29, 559.31
See application file for complete search history.

(56) References Cited

U.S. PATENT DOCUMENTS

| | | | |
|---|---|---|---|
| 5,585,626 A * | 12/1996 | Beck et al. ............... | 250/222.1 |
| 5,850,289 A * | 12/1998 | Fowler et al. ............. | 356/603 |
| 6,353,478 B1 * | 3/2002 | Rudd et al. ............... | 356/631 |
| 7,702,229 B2 * | 4/2010 | Schilling-Benz et al. .... | 396/111 |
| 2004/0174541 A1 * | 9/2004 | Freifeld ................... | 356/614 |
| 2007/0121094 A1 * | 5/2007 | Gallagher et al. .......... | 356/4.03 |
| 2009/0066931 A1 * | 3/2009 | Kang et al. ............... | 356/5.08 |

\* cited by examiner

*Primary Examiner*—Hoa Q Pham
(74) *Attorney, Agent, or Firm*—Zhigang Ma

(57) ABSTRACT

An apparatus for measuring distances includes a lens module, a light sensor, and a calculation module. The lens module is used for imaging an object to be measured. The lens module has a focal plane which is non-vertical to the light axis thereof. The light sensor is used for receiving the image of the object through the lens module, and generating a corresponding signal accordingly. The calculation module is used for calculating the distance of the object based on a high frequency part of the signal. A relative method for measuring distances is provided as well.

15 Claims, 6 Drawing Sheets

APPARATUS AND METHOD FOR MEASURING DISTANCES

BACKGROUND

1. Field of the Invention

The present invention generally relates to apparatuses and methods for measuring distances, and particularly, to an apparatus and a method using light to measure distances.

2. Description of Related Art

Distance measurements are used in various fields, such as engineering surveying, driving automobiles, etc. Electronic devices including optical elements, such as digital cameras, generally use lens to measure distances of objects to be photographed for correct focus. Some projectors also measure distances of screens to be projected on for auto focusing.

Conventionally, light pulses are used for measuring distances. A light source emits light pulses to an object to be measured. At the light source side, a light receiver is set to receive reflected light pulses. The light receiver converts the reflected light pulses into electric signals. The distance of the object to be measured can thus be calculated through the duration from the time that the light pulses are emitted to the time that the light pulses are received. Another method for measuring the distance is to calculate a phase difference between the emitted light pulses and the received light pulses. Such methods need rather accurate control and the calculation is rather complex.

DETAILED DESCRIPTION

Figure 1:
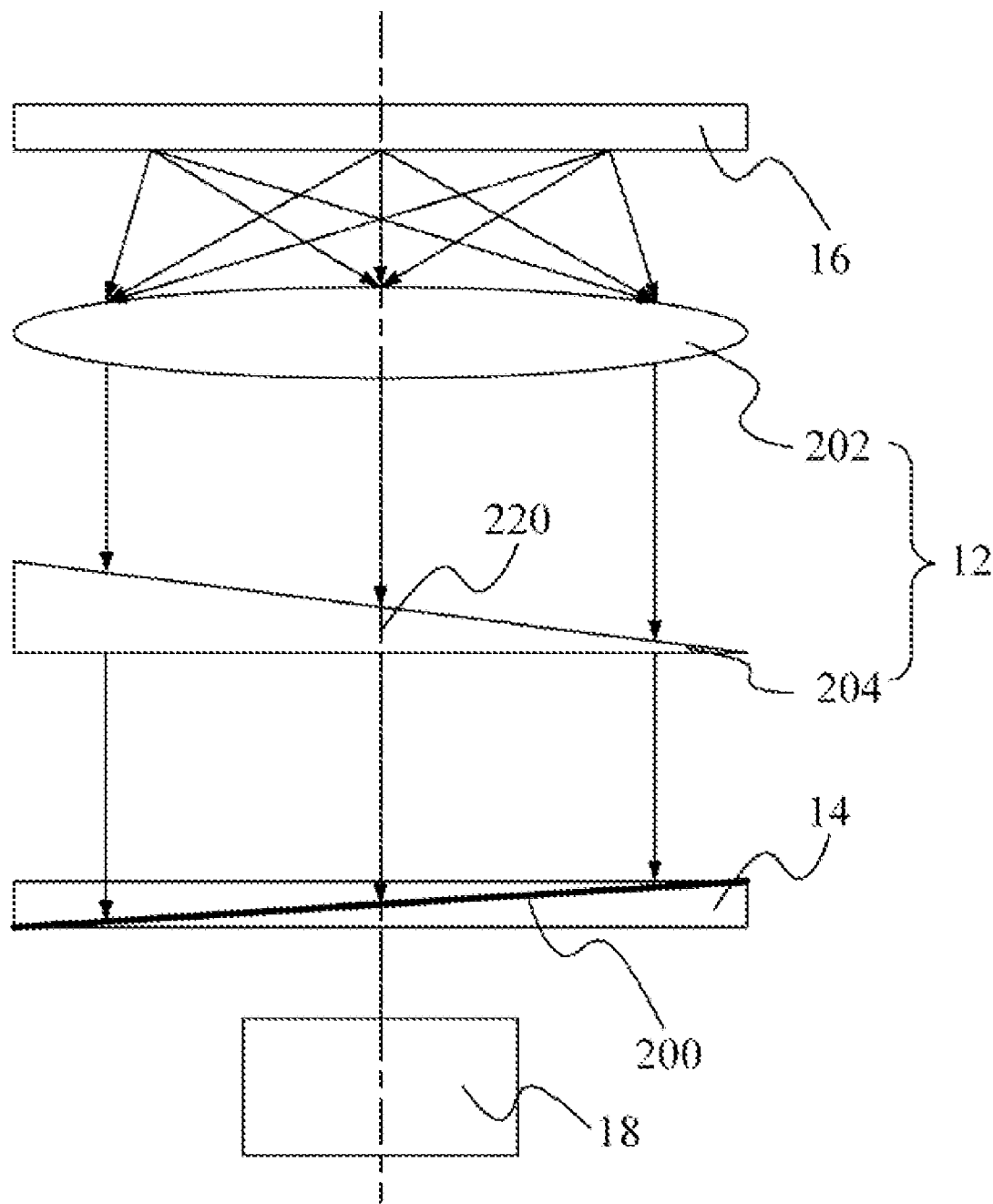
FIG. 1 is a schematic diagram of an apparatus for measuring distances in accordance with an exemplary embodiment, the apparatus including a light receiver and a calculation module.

Referring to FIG. 1, an apparatus for measuring distances in accordance with an embodiment of the present invention is illustrated. The apparatus includes a lens module 12 and a light sensor 14.

The lens module 12 is located between the light sensor 14 and an object 16 to be measured. The object 16 is imaged on the light sensor 14 through the lens module 12, and the light sensor 14 generates corresponding signals based on the image. The lens module 12 includes a first lens 202 and a second lens 204. Light from the object 16 passes through the first lens 202 and the second lens 204 sequentially, and is finally received by the light sensor 14. In this embodiment, the first lens 202 is a convex lens, and the second lens 204 has a focal plane 200 which is non-vertical to the optical axis 220 thereof.

The light sensor 14 is used for sensing the image of the object 16 through the lens module 12, and generating corresponding signals. The signals can be generated by scanning image gray on the light sensor 14. When scanning the light sensor 14, a continuous signal illustrating the image gray on the light sensor 14 is generated. For further digital calculation, the continuous signal can be sampled, therefore obtaining a discrete signal which can be denoted in form of a matrix.

Figure 2:
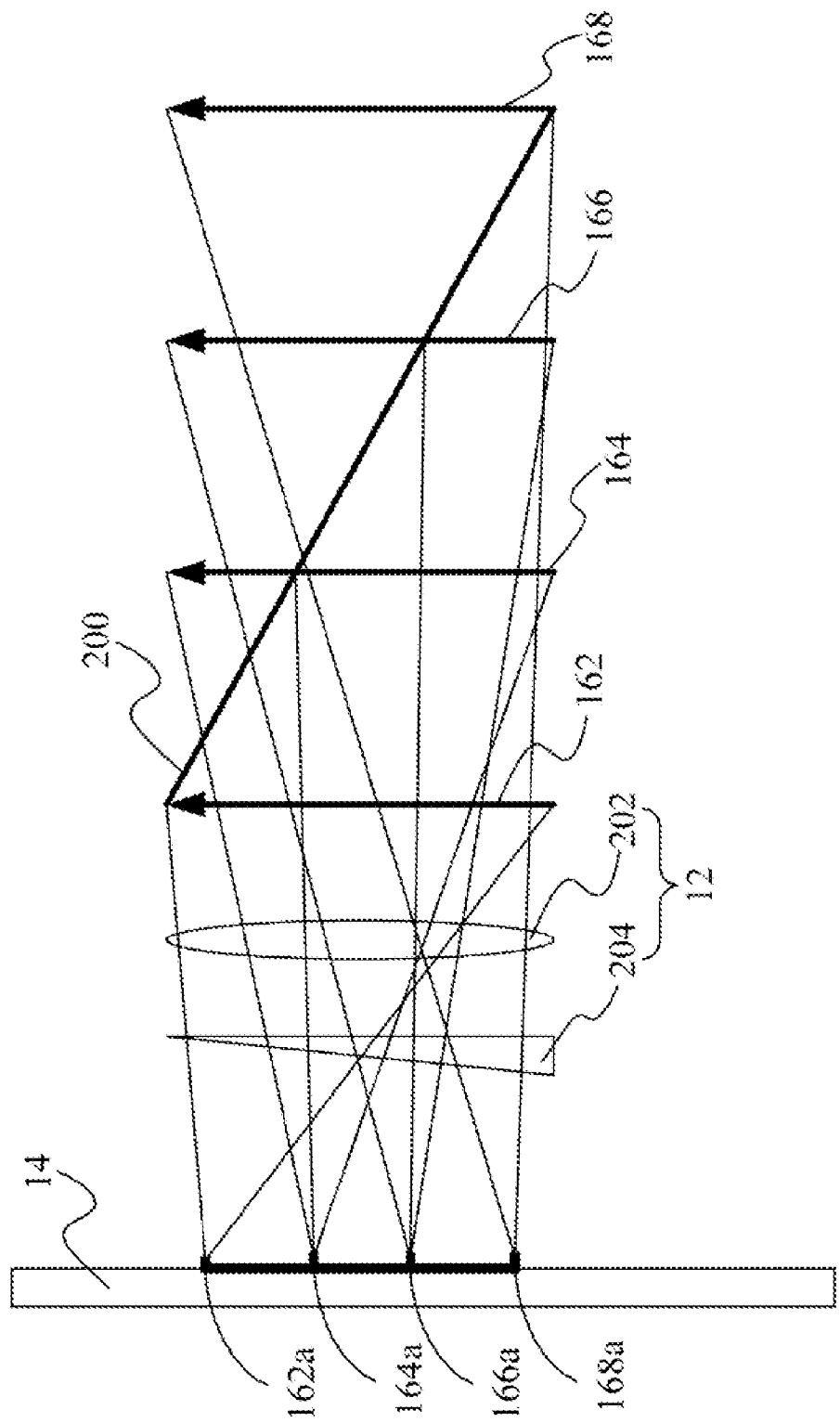
FIG. 2 is a light-path diagram of the apparatus of FIG. 1.

Referring also to FIG. 2, in measuring distances, the object 16 and the light sensor 14 are located at opposite sides of the lens module 12. When the object 16 is located within an effective imaging range of the lens module 12, the distance between the object 16 and the lens module 12 can be mapped on a position of an extremum of the image gray on the light sensor 14. For example, when the object 16 is located in the positions 162, 164, 166, and 168, respectively, the extremum of the image gray on the light sensor 14 is positioned on positions 162*a*, 164*a*, 166*a*, and 168*a*, respectively. The distance of the object 16 can thus be obtained through a mapping calculation after determining the position of the extremum of the image gray on the light sensor 14.

Figure 3:
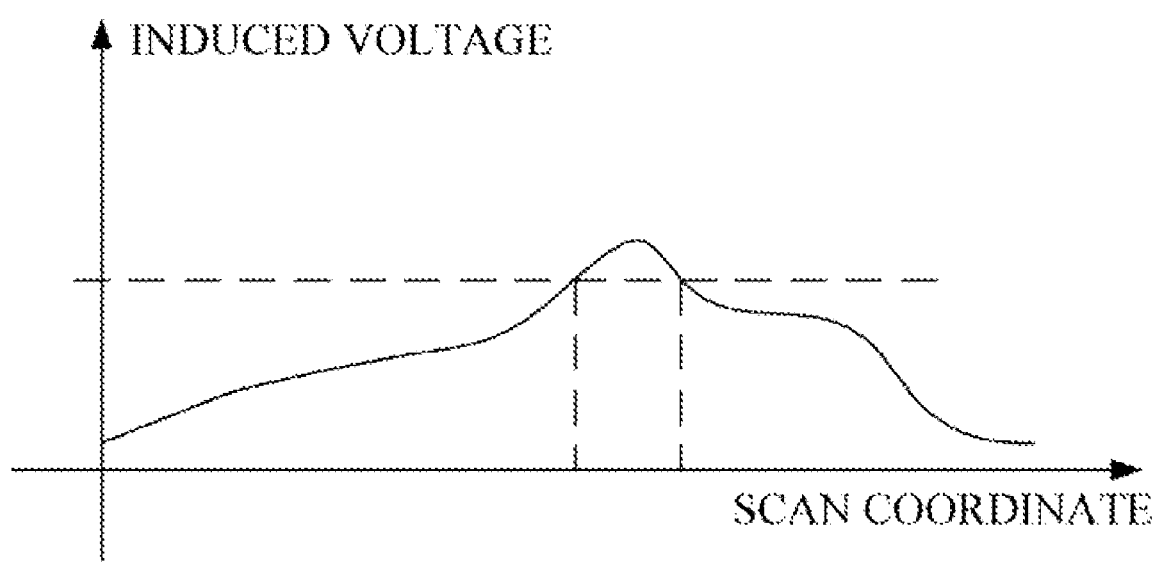
FIG. 3 is an example of a curve graph of an induced voltage after scanning the light receiver of FIG. 1.

Referring also to FIG. 3, a continuous induced voltage is illustrated. The continuous induced voltage is obtained by the light sensor 14 after scanning the image gray of the imaging of the object 16. The continuous induced voltage is variable according to the scan coordinate. At positions of focal points of the object 16, the image gray is rather high, therefore the induced voltage is high; while at positions of non-focal points, the image gray is lower than that of the focal points, therefore the induced voltage is lower. A distinct demarcation is formed on boundary between the focal points and non-focal points.

In FIG. 1, a calculation module 18 is connected to the light sensor 14. The calculation module 18 is used for calculating according to the signal from the light sensor 14, therefore determining the extremum of the image gray, and obtaining the distance of the object 16 through a mapping calculation. In general, the calculation module 18 receives a discrete signal and calculates the distance of the object 16 through a first predetermined calculation, a second predetermined calculation, and a mapping calculation.

The first predetermined calculation is carried out to obtain a frequency distribution of the image gray. The high frequency part of the image gray is corresponding to the position on which the image gray has acute differences. The first predetermined calculation can be a 2-dimensional fourier transform (2D FT). After the first predetermined calculation, the high frequency part of the image gray is chosen to take the second predetermined calculation, for determining the position of the extremum of the image gray. The second predetermined calculation can still be a 2D FT. After the second predetermined calculation, the position of the extremum of the image gray corresponding to the high frequency part of the image gray signal is obtained. Finally, through the mapping calculation of the position of the extremum, the distance of the object 16 can be obtained.

Figure 4:
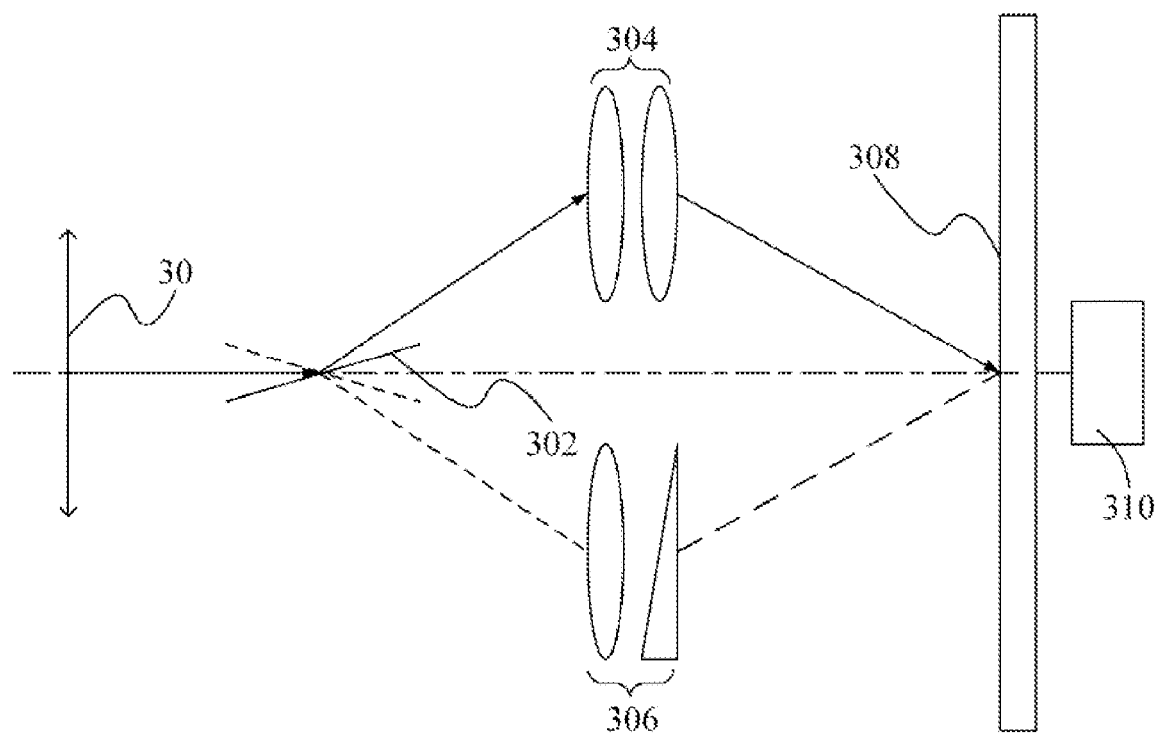
FIG. 4 is a schematic diagram of an imaging device using the apparatus of FIG. 1.

Referring to FIG. 4, an imaging device using the apparatus of FIG. 1 is illustrated. The imaging device can be a camera or a detecting device. The imaging device includes a switch 302, a first lens module 304, a second lens module 306, a detector 308 which includes a light sensor, and a calculation module 310.

When an object 30 is positioned before the imaging device, the switch 302 can be selectively switched to allow light from the object 30 to be projected to the first lens module 304 or the second lens module 306, for photographing or distance measuring, respectively.

The first lens module 304 is used for focusing light from the object 30 onto the detector 308. The detector 308 accordingly generates electrical signals corresponding to the image of the object 30 through the first lens module 304. The first lens module 304 can be any kind of known imaging lenses like camera lenses, etc.

The second lens module 306 has similar structure as the lens module 12 of FIG. 1. The second lens module 306 is able to map the distance of the object 30 onto the detector 308, reflected by the extremum of the image gray.

The calculation module 310 is similar as the calculation module 18 of FIG. 1. The calculation module 310 calculates the distance of the object 30 according to the image of the object 30 on the detector 308.

The imaging device of FIG. 4 uses one detector 308 to realize imaging and measure distance of the object 30, by switching the light from the object 30 to the first lens module 304 or the second lens module 306. Furthermore, the imaging device can image or photograph the object 30 after the distance of the object 30 is calculated, therefore the imaging or photographing can be done after a well focusing.

Figure 5:
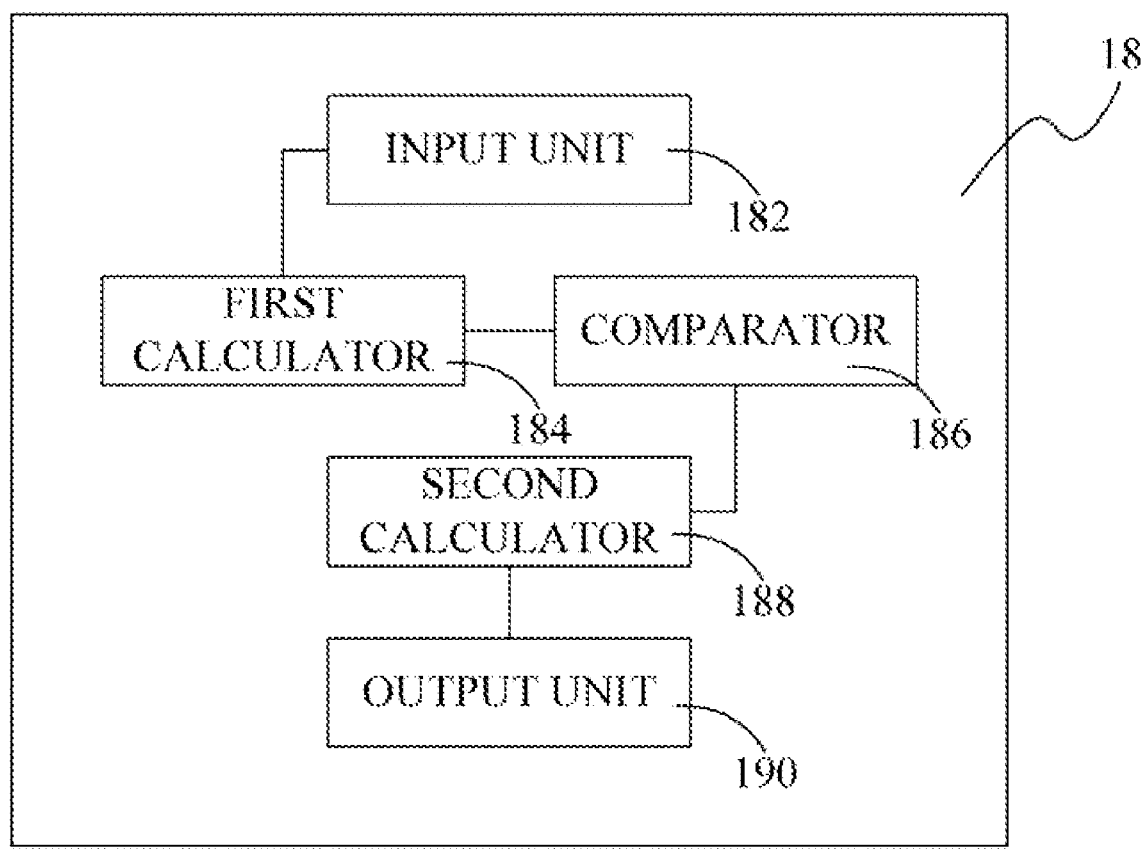
FIG. 5 is a block diagram of the calculation module of FIG. 1.

Referring to FIG. 5, a block diagram of the calculation module 18 of FIG. 1 is illustrated. The calculation module 18 includes an input unit 182, a first calculator 184, a comparator 186, a second calculator 188, and an output unit 190.

The input unit 182 is used for receiving the signal generated by the light sensor 14, and sending the signal to the first calculator 184. The signal generated by the light sensor 14 can be a 2-dimensional discrete signal, denoted in form of a matrix.

The first calculator 184 is used for carrying out the first predetermined calculation of the signal, for determining a frequency distribution of the signal. The first calculator 184 generates a frequency signal accordingly. The frequency signal is transmitted to the comparator 186.

The comparator 186 is used for comparing the frequency signal, therefore determining a extremum part of the frequency signal. The comparator 186 sends the extremum part of the frequency signal to the second calculator 188.

The second calculator 188 is used for carrying out the second predetermined calculation of the extremum part of the frequency signal transmitted from the comparator 186, therefore determining the position of the extremum of the image gray. The second calculator 188 further calculates the distance of the object 16 through the mapping calculation. In other embodiments, the mapping calculation may be carried out in another calculator. The calculated distance of the object 16 is outputted through the output unit 190.

Figure 6:
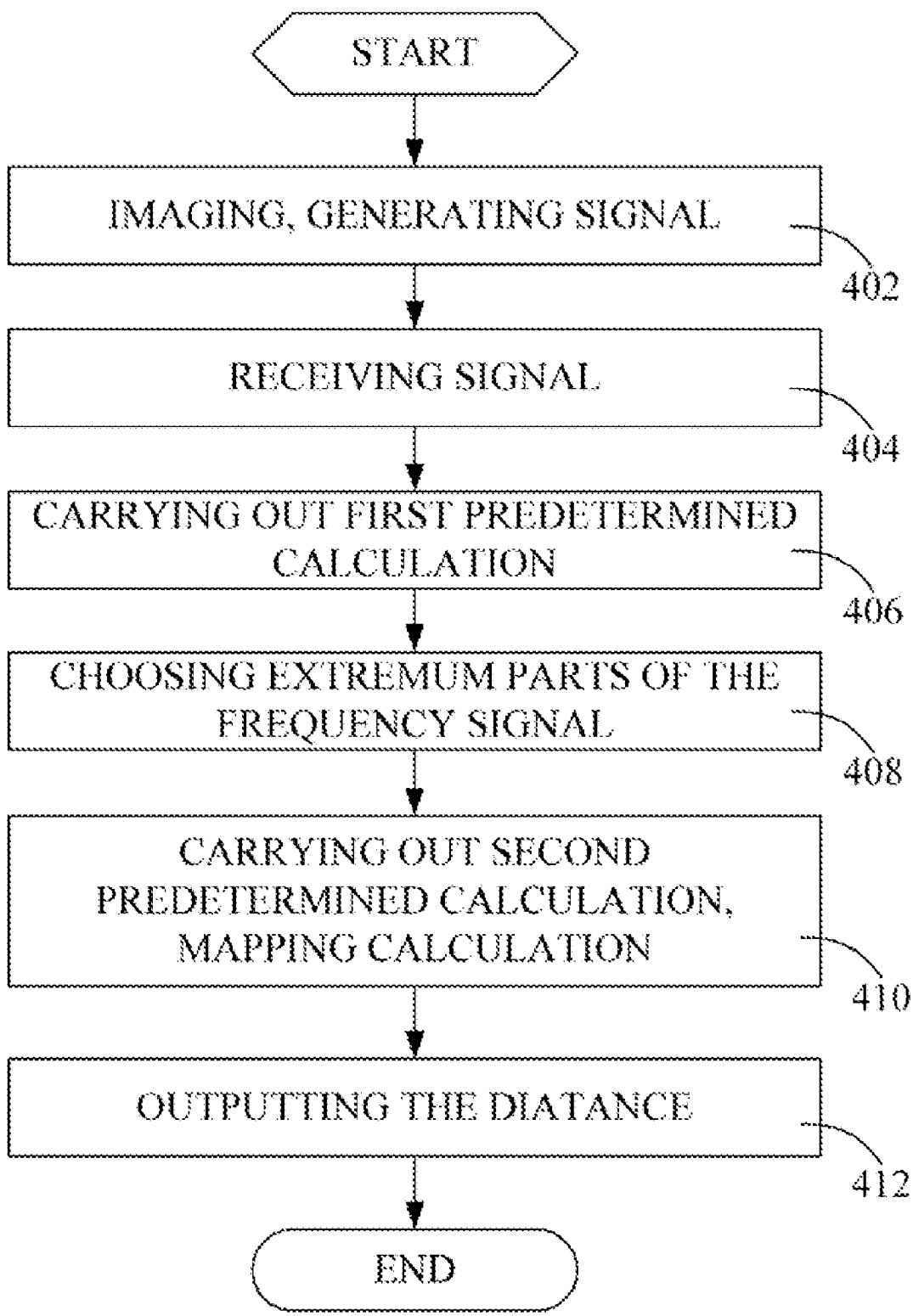
FIG. 6 shows a flowchart of a method for measuring distances in accordance with another exemplary embodiment.

Referring also to FIG. 6, a method for measuring distances in accordance with another exemplary embodiment includes steps of:

Step 402, the lens module 12 images the object 16 on the light sensor 14; a signal generated via scanning the light sensor 14 is sent to the calculation module 18.

Step 404, the input unit 182 of the calculation module 18 receives the signal, and sends the signal to the first calculator 184.

Step 406, the first calculator 184 carries out a first predetermined calculation of the signal, for determining the frequency distribution of the signal. The first calculator 184 generates a frequency signal accordingly. The first predetermined calculation is a 2D FT.

Step 408, the comparator 186 compares the frequency signal for determining an extremum part of the frequency and sends the extremum part of the frequency signal to the second calculator 188.

Step 410, the second calculator 188 carries out a second predetermined calculation of the extremum part of the frequency signal, for determining the position of the extremum of the image gray. The second calculator 188 further calculates the distance of the object 16 through a mapping calculation.

The output unit 190 outputs the calculated distance of the object 16.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An apparatus for measuring distances, comprising:
a lens module for imaging an object to be measured, the lens module comprising a focal plane which is non-vertical to the light axis thereof;
a light sensor capable of receiving the image of the object through the lens module, and generating a corresponding signal accordingly; and
a calculation module for calculating the distance of the object based on a high frequency part of the signal, the calculation module comprising a first calculator, a comparator and a second calculator, the first calculator capable of carrying out a first predetermined calculation of the signal, thereby determining a frequency distribution of the signal, the comparator capable of determining a high frequency part of the signal according to the first predetermined calculation of the first calculator, the second calculator capable of carrying out a second predetermined calculation of the high frequency part, and determining the distance of the object through a mapping calculation.

2. The apparatus as described in claim 1, wherein the image of the object received by the light receiver has an extremum image gray corresponding to the distance of the object.

3. The apparatus as described in claim 2, wherein the calculation module calculates the distance of the object via a mapping calculation, the mapping calculation maps the position of the extremum image gray on the light receiver to the distance of the object.

4. The apparatus as described in claim 1, wherein the lens module images the object on the light receiver with a focal point that includes a high image gray.

5. The apparatus as described in claim 4, wherein the position of the focal point is corresponding to distance of the object.

6. The apparatus as described in claim 5, wherein the calculation module calculates the distance of the object through a mapping calculation, the mapping calculation maps the position of the focal point on the light receiver to the distance of the object.

7. The apparatus as described in claim 1, wherein the first calculator generates a frequency signal according to the first predetermined calculation, the comparator chooses the high frequency part of the frequency signal according to the comparison, and sends the high frequency part to the second calculator.

8. The apparatus as described in claim 7, wherein the second calculator carries out the second predetermined calculation of the high frequency part of the frequency signal received from the comparator for determining a position of a focal point of the object.

9. The apparatus as described in claim 8, wherein the second calculator calculates the distance of the object through a mapping calculation that maps the position of the focal point on the light receiver to the distance of the object.

10. The apparatus as described in claim 1, wherein the first predetermined calculation is 2-dimensional Fourier transform.

11. The apparatus as described in claim 1, wherein the second predetermined calculation is 2-dimensional Fourier transform.

12. A method for measuring distances of an object, comprising steps of:
   imaging the object;
   receiving the image of the object and generating a signal according to image grays;
   determining a position of the extremum image gray; and
   determining the distance of the object via a mapping calculation that maps positions of the extremum image grays to distances of the objects, comprising steps of:
      carrying out a first predetermined calculation of the signal and generating a frequency signal accordingly;
      determining an extremum frequency according to the first predetermined calculation;
      choosing a high frequency part of the frequency signal; and
      carrying out a second predetermined calculation of the high frequency part, therefore determining the position of the extremum image gray.

13. The method as described in claim 12, wherein the step of imaging the object comprising:
   providing a lens module having a focal plane that is non-vertical to the optical axis thereof; and
   imaging the object on a light receiver via the lens module.

14. The method as described in claim 12, wherein the first predetermined calculation is a 2-dimensional Fourier transform.

15. The method as described in claim 12, wherein the second predetermined calculation is a 2-dimensional Fourier transform.

* * * * *